Patented June 15, 1954

2,681,267

UNITED STATES PATENT OFFICE 2,681,267

PROCESS OF IMPROVING THE CATALYTIC PROPERTIES OF ALUMINUM FLUORIDE AND PRODUCT THEREOF

John D. Calfee, Dayton, Ohio, and Charles B. Miller, Lynbrook, N. Y., assignors to Allied Chemical & Dye Corporation, New York, N. Y., a corporation of New York No Drawing. Application August 3, 1951, Serial No. 240,290

3 Claims. (Cl. 23—88)

This invention relates to aluminum fluoride catalysts and to processes for making the same, and is particularly directed to preparation of aluminum fluoride catalysts which are especially utilizable in fluorination reactions and which may be employed in the manufacture of fluorocarbons.

According to known methods for making fluoro and/or fluorochlorocarbons, e. g. by reaction of a suitable starting material with HF, liquid catalytic and fluorinating agents such as antimony halide salts are employed. The corrosiveness, liquid character, and ease of vaporization of antimony halide catalysts give rise to difficulties of operation which have been notable disadvantages in prior art operations.

Objects of the invention include preparation of solid catalyst having high activity in promoting formation of fluorine containing compounds, for example, by substitution of fluorine for other halogen in organic compounds. A particular object lies in preparation of aluminum fluoride catalysts capable of use at relatively mild process conditions efficiently to utilize charge materials in production of desired fluorinated product with low or minimum yields of less desired by-products.

According to the invention aluminum fluoride comprising crystallites, as contrasted with crystals, is subjected to heat in presence of oxygen at calcination temperature below that at which crystallites are subject to rapid growth to crystal form. It has been discovered quite unexpectedly that such heat treatment of aluminum fluoride comprising crystallites markedly improves their value and utility for promoting controlled fluorination of halogen containing organic compounds. In net effect the oxygen treatment of the invention yields finished catalyst which during use at proper temperature results in substantially complete consumption of the theoretical quantity of fluorinating agent required for desired product, and formation of that product with little or no over-fluorinated by-products. Application of the finished catalyst includes fluorination of halocarbons and halohydrocarbons containing one or more atoms of halogen other than fluorine by substitution of fluorine therefor, as from hydrogen or other gaseous fluoride, for a controlled part or all of that other halogen, to produce compounds comprising the two halogens in predetermined atomic ratio. One typical use of the catalyst is in promoting difluorination of halogenated methane containing three or more chlorine atoms to produce the corresponding di-fluorochlorocarbon or hydrocarbon compounds, as may be illustrated by reaction of carbon tetrachloride and hydrogen fluoride to produce dichlorodifluoromethane valuable as refrigerant or insecticide propellent.

Aluminum fluorides from a multiplicity of sources are known in the art. The majority of such materials consists of lumps or smaller discrete particles, which lumps or particles in turn are composed of $AlF_3$ crystals of relatively large size, i. e. not less than one thousand and usually several thousand angstrom units radius and above, as in the case of commercial types of aluminum fluorides available on the market. Such forms of aluminum fluoride, although exhibiting catalytic activity with respect to fluorination, for example, of tetrachlor ethylene, surprisingly do not undergo whatever structural or chemical changes which, in practice of the invention, result in the changes in catalytic properties of crystallite aluminum fluorides.

On the other hand, certain forms of aluminum fluoride, to which the invention applies, when examined even by the highest powered optical microscope, appear to be of non-crystalline or "amorphous" structure. When such "amorphous" aluminum fluorides are examined using X-ray diffraction technique, extremely small, sub-microscopic crystals, "crystallites," may be detected. Suitable starting materials for practice of the invention include aluminum fluorides of crystallite size of about 500 Å. radius or below. As crystallite size decreases below this value, the catalytic properties in general increase and particularly suitable aluminum fluorides include those having crystallite size of about 200 Å. and below (as determined by X-ray diffraction technique). Although advantageous catalytic properties, realized in practice of the invention are peculiar to the crystallites, such properties are not destroyed but merely diluted by the presence of crystals.

Catalytic aluminum fluorides having the indicated crystallite sizes and constituting the usual and preferred starting material of the invention process are included within the scope of the invention regardless of method of preparation. However, according to a particular embodiment of the invention, catalytic material is employed which may be prepared by treating aluminum halide other than aluminum fluoride (which halide is preferably in pure form but may suitably be of commercial or technical grades) with preferably excess quantities of inorganic fluorinating agent reactive therewith under conditions such that no liquid water is present in the reacting materials. For example, starting material for the catalyst treatment of the present invention may be prepared by subjecting solid aluminum halide hydrate to the action of gaseous fluorinating agent (said agent being preferably, but not necessarily, anhydrous) at temperature high enough so that the water in the hydrate is volatilized into the gas, e. g. preferably above 100° C. to +170° C., the maximum temperature for avoiding fusion depending largely upon the degree of hydration of the reactant and the water content, of any of the fluorinating agent. If desired, in forming the starting material to be used in the oxygen-heat treatment, anhydrous reagents may be employed, in which case maintenance of particular temperatures during the catalyst preparation reaction is not as critical and said reaction may be carried out with the fluorinating agent in the liquid phase. Of the fluorinating agents which may be used for catalyst preparation, boron trifluoride and hydrofluoric acid may be mentioned. We prefer anhydrous hydrofluoric acid. Anhydrous aluminum chloride is the preferred halide. Catalyst synthesis reaction is believed to proceed as follows:

$$3HF + AlCl_3 = AlF_3 + 3HCl$$

HF displaces HCl causing transformation of $AlCl_3$ into $AlF_3$. After formation of the aluminum fluoride, it may be subjected to the free oxygen gas-heat treatment of the present invention.

Although not essential to realization of the objects of the invention, a suitable and convenient means for preparing the aluminum fluoride to be subjected to oxygen treatment is to add solid anhydrous aluminum chloride to an excess of liquefied anhydrous hydrofluoric acid in a cooled container and, after complete addition of the aluminum chloride, mildly agitate the mixture until reaction is substantially complete. Following, is an example illustrating preparation of $AlF_3$ according to the latter procedure, in which parts and percentages expressed are by weight.

EXAMPLE A 300 parts of granular (8 to 18 mesh) anhydrous aluminum chloride of commercial grade were added in small portions to liquid anhydrous hydrofluoric acid contained in an externally cooled vessel. A vigorous exothermic reaction took place and additional amounts of hydrofluoric acid were added as needed to maintain an excess thereof. After all the aluminum chloride had been added, the mixture was stirred to promote residual reaction. When reaction of aluminum chloride appeared complete, the mass was mixed and stirred with additional liquid hydrofluoric acid and excess HF was removed by slowly boiling the mixture. 200 parts of anhydrous aluminum fluoride of about 10–40 mesh size having greater than 98% $AlF_3$ content and containing less than 0.15% chlorine were recovered. An X-ray diffraction pattern of material prepared according to the method outlined above, indicated crystallite size to be less than 100 angstrom units radius, i. e. the crystallite size was so small as to be indicative of "amorphous" structure as desired for the purpose of the present invention. Color of the catalyst was off-white to light gray.

As indicated above a particular procedure utilizing HF gas as fluorinating agent for the $AlCl_3$ comprises treating anhydrous $AlCl_3$ or the hydrate with HF gas (preferably anhydrous) at temperature sufficiently high to cause reaction between $AlCl_3$ and HF and to volatilize and maintain any water present in the system in the gas phase (preferably 100–170° C., consistent with avoidance of fusion, in case the hydrate is employed), but low enough to prevent excessive volatilization of $AlCl_3$ (preferably below about 125° C. when anhydrous $AlC_3$ is treated). Aluminum fluoride so prepared has also been found to be composed of crystallites of size substantially below 200 Å. as desired for oxygen activation according to the invention. Gas phase preparation of catalyst is illustrated by the following example:

EXAMPLE B 5000 parts of 4 to 14 mesh anhydrous aluminum chloride of commercial grade were charged to a nickel reactor and heated therein while passing through the reactor a stream of anhydrous HF gas, to bring about the following reaction:

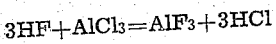

$$AlCl_3 + 3HF \rightarrow AlF_3 + 3HCl$$

The HF was admitted at a sufficiently slow rate to keep the temperature in the reaction zone (exothermic reaction) below about 90° C. to prevent excessive loss of $AlCl_3$ by volatilization. As the reaction neared completion, as evidenced by a sharp decline in reactor temperature, heat was applied externally to the reactor and temperature raised to about 300° C. while still continuing passage of a slow stream of HF through the tube, until last traces of $AlCl_3$ were converted to $AlF_3$. The size and shape of the solid material was about the same before and after treatment with gaseous HF. 2674 parts of anhydrous aluminum fluoride containing 98+% $AlF_3$ and less than 0.10% chlorine, were recovered. An X-ray diffraction pattern of the resulting off-white to light gray material prepared according to the latter gas phase procedure was made which indicated crystallite size to be in the range of 100–200 angstrom units radius, the average being 140 Å., i. e. the crystallite size was so small as to be indicative of "amorphous" structure as desired for activation with oxygen according to the present invention.

The gas used for oxygen treatment of the aluminum fluoride crystallite catalyst according to the present invention may be any gas containing free oxygen of $O_2$ content sufficiently high to effect the desired modification of catalytic fluorinating characteristics of the aluminum fluoride being treated. Commercial oxygen gas is preferably employed, but air or other free oxygen-containing gas of lower $O_2$ content may be used. At the outset of the oxygen-heat treatment, beneficiation of the catalyst progresses rapidly but slows up toward the end of the operation. Thus, air may be used for the major part of the treatment, the later stage of which may be hastened and completed by use of commercial oxygen gas. Hence, it is preferred to use oxygen gas during say at least the last quarter of the treatment operation. A result of use of gases of lower $O_2$ content is that longer time of contact between aluminum fluoride and oxygen gas, or possibly higher contact temperatures may be necessary in order to bring about conditioning within a reasonable span of time.

The temperature of the aluminum fluoride during oxygen treatment is maintained at an elevated level which is sufficiently high to effect the desired modification of catalytic fluorinating characteristics. Temperature materially affects the rate of treatment and hence, the lower limit of temperature will be determined largely by minimum permissible rate of treatment. We have found that by maintaining the temperature of the aluminum fluoride during oxygen treatment above about 400° C., satisfactory conditioning or changes of catalytic properties may be effected. At such temperatures aluminum fluoride catalysts may be obtained which are superior for catalyzing the fluorination of organic compounds, e. g. substitution of fluorine for other halogen on an aliphatic carbon atom. At higher treatment temperatures, rate of conditioning is correspondingly higher and accordingly, the minimum preferred temperature is about 450° C. The temperature employed at any particular operation depends largely upon the source of the aluminum fluoride starting material, the reaction in which the catalyst is to be employed and the particular design (e. g. reactor diameter and length) of the equipment for carrying out said reaction. Although oxidation temperatures as high as 575° C. may be employed to advantage, temperature above about 600° C. should not be employed for substantial periods of time.

Generally, the process of the invention is carried out by contacting the aluminum fluoride starting material with free oxygen-containing gas at temperature in the range indicated which effects the desired degree of conditioning or change of selectivity of the catalyst according to the circumstances at hand. Operations may be suitably carried out by introducing such gas, preferably continuously, into a reaction zone containing aluminum fluoride, heating the aluminum fluoride in the zone at temperatures stated, and withdrawing the gas from the zone. The aluminum fluoride undergoing treatment is contacted with the free oxygen-containing gas for a time sufficient to bring about the desired conditioning or change of fluorinating characteristics. The optimum treatment time may vary, depending upon particular material at hand, treatment temperature, or whether air or oxygen is employed. Generally, treatment time with free oxygen-containing gas, e. g. air or oxygen may vary from about one half to about eight and a half hours depending mostly on the oxygen content of the treatment gas, and end point of treatment may be determined by sample test or by experience. In one instance, treatment with air at 510–525° C. for about 5 hours produced satisfactory results. In other instances, satisfactory results may be obtained by using oxygen gas at temperatures of about 500–560° C. for periods varying from one half to 2 hours. In another operation, the catalyst was treated with air for about 5 hours at temperature in the range of 510–525° C. and then for about 3 hours with commercial oxygen in the range of 515–550° C., in which circumstance at the end of a 79 hour CCl₄ fluorination run similar to following Example 1, the product gas contained CClF₃/CCl₂F₂ in mol ratio of about 0.03. Completely treated material is usually off-white to light gray in color, and is usually somewhat lighter in color than the catalyst when freshly prepared and prior to oxygen-heat treatment.

Control of AlF₃ temperature during treatment may be obtained by coordination of rate of introduction of free oxygen-containing gas into the treating zone (higher rates causing higher zone temperatures when the aluminum fluoride contains appreciable amounts of organic material) and supplemental heat transfer means supplied externally of the treating vessel, e. g. electrical resistance heaters. Subsequent to oxygen treatment, the aluminum fluoride catalyst, after reduction of the temperature to suitable levels, may be directly used in substitution of fluoride for other halogen on aliphatic carbon atoms in the presence of gaseous hydrogen fluoride, e. g. to catalyze reaction of CCl₄ and HF to form CCl₂F₂ predominantly.

Although certain aspects of the foregoing description are directed to use of freshly prepared non-crystalline AlF₃ as starting material for oxygen treatment, our invention is not so limited. Oxygen treatment may be administered, if desired, at any time after the AlF₃ (which has not been previously oxygen-heat treated) is put into use, and the catalyst may thereby be brought to substantially the same condition and efficiency, e. g. of fluorination, as if the catalyst had been oxygen-heat treated immediately after preparation. For example, freshly prepared non-oxygen treated non-crystalline AlF₃ may be used to promote a fluorination reaction for any desired length of time, after which time the catalyst may be treated with free oxygen-containing gas under the aforedescribed conditions and all the benefits previously set forth in connection with original oxygen treatment will be realized. Hence, one phase of the present improvements is directed to application of the hereindescribed oxygen-heat treatment to freshly prepared AlF₃ catalysts and to AlF₃ catalysts which have seen catalytic service but have not been subjected previously to the hereindescribed oxygen-heat treatment.

Advantages afforded by the invention may be appreciated from consideration of an illustrative use of the disclosed oxygen-heat treated catalysts. For example, when carrying out catalytic fluorination of CCl₄ with HF to form CCl₂F₂ certain amounts of less desired CCl₃F and CClF₃ are formed as by-products. CCl₃F may be recycled to subsequent operation and thereby converted to sought-for CCl₂F₂; but CClF₃ is not a sought-for product and is not readily converted to CCl₂F₂. In such an operation, the percent fluorination (i. e. percent utilization of HF), feasible low temperature, molar ratio of

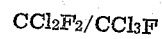

CCl₂F₂/CCl₃F and particularly the ratio of CClF₃/CCl₂F₂, are indicia of the suitability of the catalytic material being employed. An outstanding advantage of our oxygen-activated aluminum fluoride is that unusually high percentage HF utilization, and high CCl₂F₂/CCl₃F ratio, and low ratio of CClF₃/CCL₂F₂ may be realized. Ordinarily, the fluorination reaction becomes more complete (percent HF converted increases) as fluorination temperature is increased. Since lower operating temperatures, consistent with a high HF utilization, are generally preferred, it is a further advantage of this invention that by use of oxygen treated AlF₃ catalyst, adequately high fluorination may be obtained at substantially lower operating temperature than when using catalyst not so treated.

In connection with these permissibly lower operating temperatures, as illustrated in the following examples, another advantageous feature which is afforded and which is apparently conjunctive with the permissibly lower operating temperature is that the oxygen-heat treated catalyst, when used at the permissibly lower temperature of operation, is rendered selective and effects formation of substantially less CClF₃ than does the untreated catalyst when the latter is used at the substantially higher operating temperatures which are then required to get adequately high HF utilization. Thus, the oxygen-heat treatment of the invention affords the major advantage of facilitating manufacture of a catalyst providing for lower operating temperatures which in turn makes possible adequate HF utilization, and, at the same time, when operating at these lower temperatures formation of $CClF_3$ is minimized. Hence, it will be appreciated that the oxygen-heat treated catalysts of the invention are beneficiated to modify the normal catalytic activity of the untreated catalyst and to change the catalytic fluorinating characteristics, for example, with respect to restricting substitution of more than two fluorine atoms for other halogen on aliphatic carbon atoms in the presence of gaseous hydrogen fluoride, as exemplified with respect to minimizing catalytic formation of fluorinated methane derivatives containing more than two fluorine atoms, i. e. such as inhibiting formation of $CClF_3$ in the manufacture of $CCl_2F_2$ by catalytic reactions of $CCl_4$ and HF. The process of the invention effects beneficiation of catalytic properties, and the term beneficiation is employed herein to indicate improvement in any one or more of the factors such as consumption of fluorinating agent, ratio of over-fluorinated to desired product, ratio of the latter to underfluorinated material, and facilitation of low temperature operation.

The following examples illustrate practice of our invention, parts and percentages, unless otherwise indicated, being by weight:

Example 1.—625 parts of aluminum fluoride prepared by the method outlined in Example B above were arranged in a fixed bed supported on a nickel screen in a vertically mounted 1 inch internal diameter, 60 inch long nickel tube. The tube was encased in an electrical resistance heater for the purpose of maintaining internal tube temperature within desired limits during reaction. The tube ends were fitted with pipe connections for the inlet and outlet of a gas stream and for the insertion into the nickel tube and catalyst bed of suitable thermocouples. The $AlF_3$ was activated by passing a stream of air thru the tube at a rate of about 0.2 cu ft. per min., and heating the $AlF_3$ in the presence of said stream for 3½ hours while maintaining the temperature in the catalyst bed above 400° C. and the maximum temperature in the bed at about 430° C. The catalyst temperature was then reduced to about 200° C.

Liquid $CCl_4$ was vaporized, mixed with gaseous HF in the desired proportion and the mixture was introduced at a predetermined rate into the bottom of the nickel tube and passed upwardly through the bed of $AlF_3$. By adjusting the current in the electric heater, desired temperature in the catalyst bed was maintained. Gaseous products of the reaction were withdrawn over- head, cooled to condense unreacted $CCl_4$, thence passed successively through a water scrubber and a drier containing $CaCl_2$ as the drying agent. The gas obtained was analyzed in an infra-red analyzer to determine ratios of $CCl_2F_2/CCl_3F$ and $CClF_3/CCl_2F_2$, and HF content of the reactor effluent was determined by titration of the water scrubber liquid. A condenser held at about minus 78° C. by means of an external cooling bath of Dry Ice-acetone was employed for recovery of gaseous products. Unreacted $CCl_4$ recovered was suitable for recycle to the fluorination reactor.

Results for a series of tests carried out at various temperatures are summarized below in Table 1.

Table 1

| Feed HF/CCl₄* | Temp., av. | Contact time, sec. | Percent conv. of HF | Products | |
|---|---|---|---|---|---|
| | | | | CClF₃/CCl₂F₂* | CCl₂F₂/CCl₃F* |
| 1.3 | 206 | 3.0 | 97.0 | 0.05 | 4.1 |
| 1.3 | 203 | 2.0 | 98.5 | 0.04 | 2.8 |
| 1.1 | 210 | 1.8 | 98.0 | 0.05 | 3.5 |
| 1.1 | 206 | 1.32 | 95.5 | 0.0 | 1.45 |
| 1.3 | 225 | 1.32 | 97.2 | -------- | 2.1 |

*All ratios are on mol basis.

Example 2.—500 parts (500 cc.) of fresh unused and "unoxidized" aluminum fluoride (5 to 18 mesh) prepared by the procedure described in Example B, were arranged in a bed in a nickel tube of the type described in Example 1. $CCl_4$ and HF in molar ratio of 1.2:1 were passed through the tube in the manner described in Example 1, and at a rate to afford contact time of each increment of gas with catalyst equal to about 3.0 seconds. The exit gas was analyzed as in Example 1 and the product condensed. During a total operating period of 18½ hours, various temperatures were maintained in the catalyst bed and results obtained were summarized in Table 2, below.

Table 2

[HF/CCl₄=1.2 mol ratio. Contact time=3.0 sec.]

| Temp., degrees | Percent Conv. of HF | CClF₃/CCl₂F₂* | CCl₂F₂/CCl₃F* |
|---|---|---|---|
| 250 | 98.3 | >0.20 | -------- |
| 235 | 96.8 | 0.20 | 1.5 |
| 215 | 95.6 | 0.13 | 2.0 |

*Ratios are on mol basis.

A comparison of Example 1, which illustrates fluorination of $CCl_4$ in the presence of our improved "oxidized" $AlF_3$ catalyst, with Example 2 illustrating use of "unoxidized" $AlF_3$, shows the superior efficiency of the catalyst of this invention for selective production of sought-for $CCl_2F_2$, minimum formation of $CClF_3$, and high conversions of HF at low temperatures.

Example 3.—The catalyst employed in Example 2 was subsequently treated with air in an activation tube similar to that used in Example 1 at about 450° C. for one hour, the air passing thru the tube at a rate of about 0.2 cu. ft. per min., and then cooled to about 200° C. $CCl_4$ and HF in molar ratio in the range 1.4 to 1.6 HF/CCl₄ were passed through the tube in the manner described in Example 2. The exit gas was analyzed as in Example 1 and the product condensed. Various temperatures were maintained in the catalyst bed and the results based on operation at each temperature are summarized in Table 3 below:

Table 3

[HF/CCl₄ ratio*=1.4–1.6.]

| Temp., degrees | Cont. time sec. | Percent conv. of HF | CClF₃/CCl₂F₂* | CCl₂F₂/CCl₃F* |
|---|---|---|---|---|
| 206 | 3.0 | 96 | | |
| 195 | 3.0 | 98 | | |
| 186 | 3.0 | 95.8 | 0.04 | >2.0 |
| 182 | 2.5 | 95.5 | 0.00 | 1.5 |
| 182 | 2.0 | 95.5 | 0.00 | 1.3 |

*Ratios are on mol basis.

The results appearing in Table 3 are comparable to those tabulated in Example 1, thereby indicating that oxygen treatment may be administered to aluminum fluoride catalyst, if desired, after it is put into use and the catalyst thereby brought substantially to the same high activity and efficiency of fluorination as if the catalyst had been oxygen treated immediately after preparation.

Hereindescribed methods for making catalytic aluminum fluoride by procedures involving use of gaseous fluorinating agents constitute the claimed subject matter of Woolf and Miller application Serial No. 240,295, filed August 3, 1951.

We claim:

1. The process of improving the catalytic properties of aluminum fluoride which comprises contacting said aluminum fluoride, having crystallite size not substantially greater than about 500 angstrom units, radius, at temperature in the range of 400–600° C. with free oxygen-containing gas for a time period in the range of 0.5–8.5 hours.

2. The process of improving the catalytic properties of aluminum fluoride which comprises subjecting said aluminum fluoride, having crystallite size not substantially greater than about 500 angstrom units radius, to an oxygen-heat treatment comprising passing through said aluminum fluoride a stream of oxygen-containing gas while maintaining said aluminum fluoride at temperatures in the range of 400–600° C., and continuing said treatment for a time period in the range of 0.5–8.5 hours, said gas at least during a substantial portion of the final stage of said treatment being substantially pure oxygen.

3. An oxygen-heat treated aluminum fluoride fluorinating catalyst composed of crystallites of size not substantially greater than about 500 angstrom units radius, and having been heat treated in the range of 400–600° C. in the presence of free oxygen-containing gas, and having selective fluorinating activity in preventing substitution of more than two fluorine atoms for other halogen on aliphatic carbon atoms in the presence of gaseous hydrogen fluoride.

No references cited.